US011905110B2

(12) United States Patent
Chon et al.

(10) Patent No.: US 11,905,110 B2
(45) Date of Patent: Feb. 20, 2024

(54) WASTE RECEPTACLE

(71) Applicant: Kimberly-Clark Worldwide, Inc., Neenah, WI (US)

(72) Inventors: Dok Chon, Gwangjin-gu (KR); SungJin Moon, Gwangju-si (KR); SungWoo Kim, Osan-si (KR)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 224 days.

(21) Appl. No.: 17/269,245

(22) PCT Filed: Aug. 17, 2018

(86) PCT No.: PCT/US2018/046902
§ 371 (c)(1),
(2) Date: Feb. 17, 2021

(87) PCT Pub. No.: WO2020/036601
PCT Pub. Date: Feb. 20, 2020

(65) Prior Publication Data
US 2021/0323761 A1 Oct. 21, 2021

(51) Int. Cl.
*B65F 1/14* (2006.01)
*B65F 1/08* (2006.01)

(52) U.S. Cl.
CPC .............. *B65F 1/1431* (2013.01); *B65F 1/08* (2013.01); *B65F 1/1436* (2013.01); *B65F 2210/18* (2013.01); *B65F 2240/164* (2013.01)

(58) Field of Classification Search
CPC ...... B65F 1/141; B65F 1/1436; B65F 1/0013; B65F 2210/18; B65F 2240/164; E05D 11/06; A61L 11/00
See application file for complete search history.

(56) References Cited

U.S. PATENT DOCUMENTS 5,386,910 A * 2/1995 Liss ........................ B65F 1/062
220/676
5,826,789 A 10/1998 Decaux et al.
(Continued)

FOREIGN PATENT DOCUMENTS

CN 201258170 Y 6/2009
CN 202030241 U 11/2011
(Continued)

OTHER PUBLICATIONS

Socially Acceptable Containment Sanitary Napkin and Tampon Dispos; https://www.amazon.com/dp/B00NWQGU4E/ref=sspa_dk_detail_0?psc=1&pd_rd_i=B00NWQGU4E&pd_rd_w=tkGbi&content-id=amzn1.sym.0d1092dc-81bb-493f-8769-d5c802257e94&pf_rd_p=0d1092dc-81bb-493f-8769-d5c802257e94&pf_rd_r=PQWNR7HVEZGBBKB2S22Q&pd_rd (Year: 2014).*
(Continued)

*Primary Examiner* — Mollie Impink

(57) ABSTRACT

A waste receptacle comprising a columnar body having a waste bin holding area configured to accept a waste bin, an upper body portion and a lower body portion, wherein the upper portion includes an waste opening through which waste can vertically enter the bin holding area; a front door having top and bottom portions, wherein the bottom portion is pivotally attached to the lower body portion; an opening restraint device connected to the body and the front door and configured to prevent the front door from pivoting away from the body more than about 45 degrees; and wherein the waste receptacle has a height, width and depth and has an omega value that is defined as a ratio of the depth over the height and is between 0.25 and 0.33.

12 Claims, 12 Drawing Sheets

(56) References Cited

U.S. PATENT DOCUMENTS

| | | | | |
|---|---|---|---|---|
| 6,193,091 | B1 * | 2/2001 | Olivetti | B65F 1/1436 220/23.88 |
| 6,962,301 | B1 | 11/2005 | Chang | |
| 2006/0261143 | A1 * | 11/2006 | Sola Barbarin | B65F 1/1473 220/908 |
| 2009/0223991 | A1 * | 9/2009 | Lorenzati | A47K 10/424 221/34 |
| 2013/0298506 | A1 * | 11/2013 | Lucas | B65F 1/1426 53/574 |
| 2016/0194150 | A1 | 7/2016 | Romano et al. | |
| 2016/0229628 | A1 | 8/2016 | Chakravarthy et al. | |
| 2018/0186267 | A1 * | 7/2018 | Cressy | B60N 3/08 |
| 2019/0374073 | A1 * | 12/2019 | Heckard | B65D 83/0835 |

FOREIGN PATENT DOCUMENTS

| | | | |
|---|---|---|---|
| CN | 103922057 | A | 7/2014 |
| CN | 304094525 | S | 4/2017 |
| DE | 9205344 | U1 | 7/1992 |
| DE | 20119196 | U1 | 4/2002 |
| DE | 202009014444 | U1 | 4/2010 |
| DE | 202010012304 | U1 | 12/2010 |
| GB | 488662 | A | 7/1938 |
| JP | H0514003 | U | 2/1993 |
| JP | 1060888 | S | 2/2000 |
| JP | 1137143 | S | 3/2002 |
| JP | 1162815 | S | 1/2003 |
| JP | 1188262 | S | 10/2003 |
| JP | 1229196 | S | 1/2005 |
| JP | 1237887 | S | 4/2005 |
| JP | 1237890 | S | 4/2005 |
| JP | 1450464 | S | 9/2012 |
| JP | 1450465 | S | 9/2012 |
| JP | 1528088 | S | 7/2015 |
| JP | 1528136 | S | 7/2015 |
| JP | 1528306 | S | 7/2015 |
| JP | 1544871 | S | 2/2016 |
| KR | 101120869 | B1 | 2/2012 |
| KR | 101375568 | B1 | 3/2014 |
| KR | 101535754 | B1 | 7/2015 |
| KR | 101595068 | B1 | 2/2016 |
| KR | 101620492 | B1 | 5/2016 |
| KR | 20160109608 | A | 9/2016 |
| KR | 101689271 | B1 | 1/2017 |
| KR | 20170022543 | A | 3/2017 |
| KR | 101726248 | B1 | 4/2017 |
| KR | 101763644 | B1 | 8/2017 |
| KR | 101800269 | B1 | 11/2017 |
| WO | 07035138 | A1 | 3/2007 |
| WO | 2018009745 | A1 | 1/2018 |

OTHER PUBLICATIONS https://www.amazon.com/Sanitary-Disposal-Receptacle-Surface-Bracket/dp/B01MXJ0DXL/ref=sr_1_44?crid=LIOMLGICLCW9&keywords=wall%2Bmounted%2Bbathroom%2Bstall%2Bbin&qid=1689362661&sprefix=wall%2Bmounted%2Bbathroom%2Bstall%2Bbin%2Caps%2C133&sr=8-44&th=1; S.A.C. Socially Acceptable Containment (Year: 2016).*

Eko, "Eko 40 litre slim jim tall narrow home office reception push top lid & wide metal step on foot pedal kitchen waste receptacle rubbish dustbins. Slimline trash garbage bins with inner durable plastic storage container / liner", Amazon.co.uk., https://www.amazon.co.uk/Eko-reception-receptacle-dustbins-container/dp/B01HIDXKHQ.

* cited by examiner

WASTE RECEPTACLE

TECHNICAL FIELD

This disclosure generally relates to waste receptacles, including for sanitary pads and the like.

BACKGROUND OF THE DISCLOSURE

Waste receptacles are common in open areas of a washroom, for example, around sinks and paper towel dispensers. In some washrooms toilet stalls also have waste receptacles, for example, for feminine sanitary pads or other disposable hygiene products, as flushing such pads and products down the toilet can lead to clogged toilets, which can be difficult and costly to fix. However, most stalls have limited space and it can be challenging to find room for a waste receptacle large enough to not require excessive emptying but small enough to suitably fit into the stall and not unnecessarily encroach on the stall occupant's space.

SUMMARY OF THE DISCLOSURE

One aspect of the subject matter described in this specification can be implemented in systems that include a waste receptacle comprising a columnar body having a waste bin holding area configured to accept a waste bin, an upper body portion and a lower body portion, wherein the upper portion includes an waste opening through which waste can vertically enter the bin holding area; a front door having top and bottom portions, wherein the bottom portion is pivotally attached to the lower body portion; an opening restraint device connected to the body and the front door and configured to prevent the front door from pivoting away from the body more than about 45 degrees; and wherein the waste receptacle has a height, width and depth and has an omega value that is defined as a ratio of the depth over the height and is between 0.25 and 0.33.

Yet another aspect of the subject matter described in this specification can be implemented in systems that include a waste receptacle for sanitary pads comprising an elongated body having a waste bin holding area configured to accept a waste bin, an upper body portion and a lower body portion, wherein the upper portion includes an waste opening through which waste can vertically enter the bin holding area; a front door having top and bottom portions; a hinge connected to the bottom portion of the front door and the lower body portion; and wherein the waste receptacle has a height, width and depth and has an omega value that is defined as a ratio of the depth over the height and is between 0.25 and 0.33.

Particular embodiments of the subject matter described in this specification can be implemented so as to realize one or more of the following advantages. For example, the waste receptacle has an elongated shape with a particularly selected height and depth to maximize the amount of waste it can hold without intrusively encroaching into the occupant's stall space. Further, given such limited stall space the receptacle is designed to restrict the front door from opening more than about 45 degrees (and preferably about 30 degrees) to enable the internal waste bin, accessible through the opened front door, to be removed for emptying without encroaching into the working space of the washroom attendant servicing the stall while still allowing the bin to be easily removed.

The details of one or more implementations of the subject matter described in this specification are set forth in the accompanying drawings and the description below. Other features, aspects, and advantages of the subject matter will become apparent from the description, the drawings, and the claims.

Figure 1A:
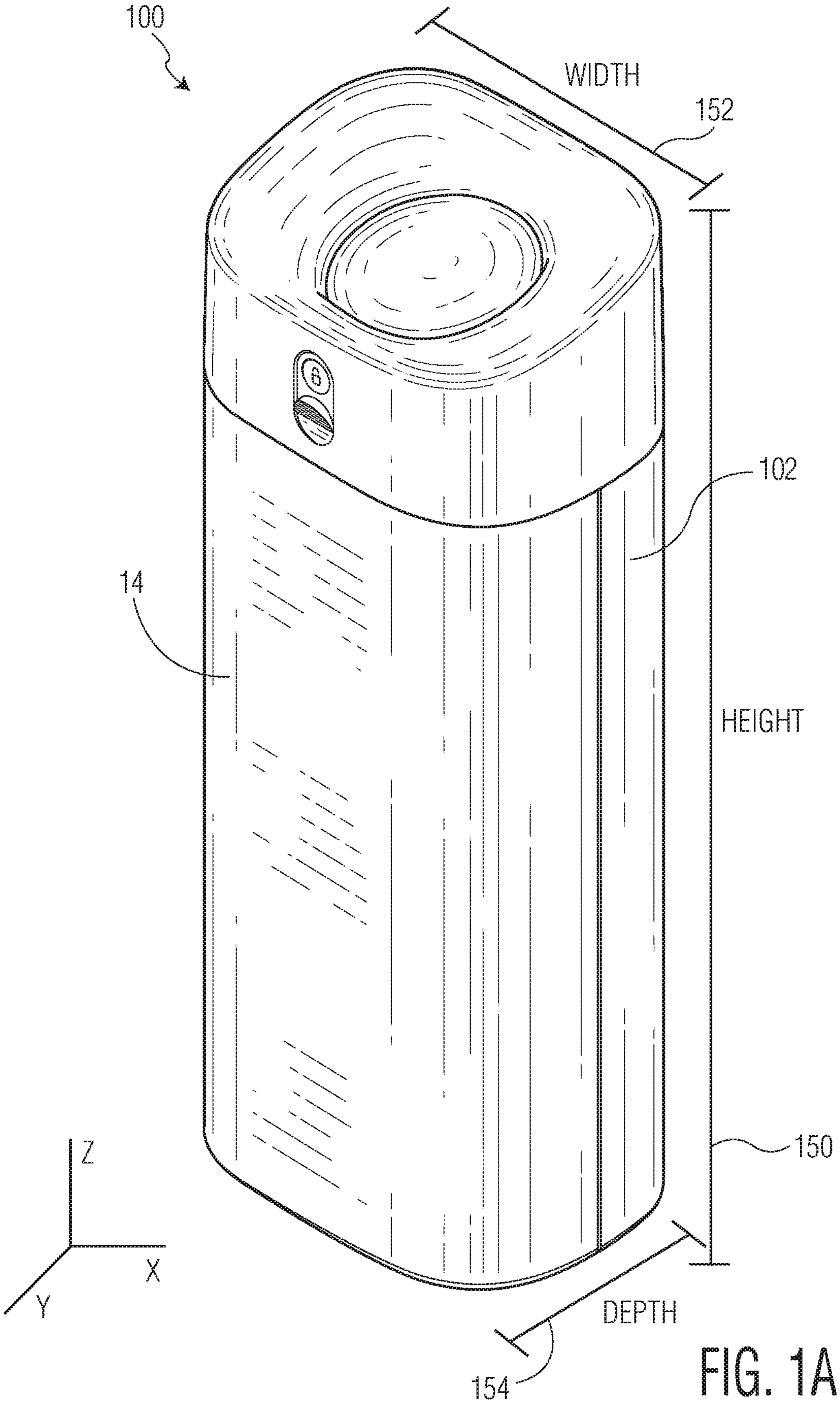
FIG. 1A is a front perspective of an example waste receptacle.
Figure 1B:
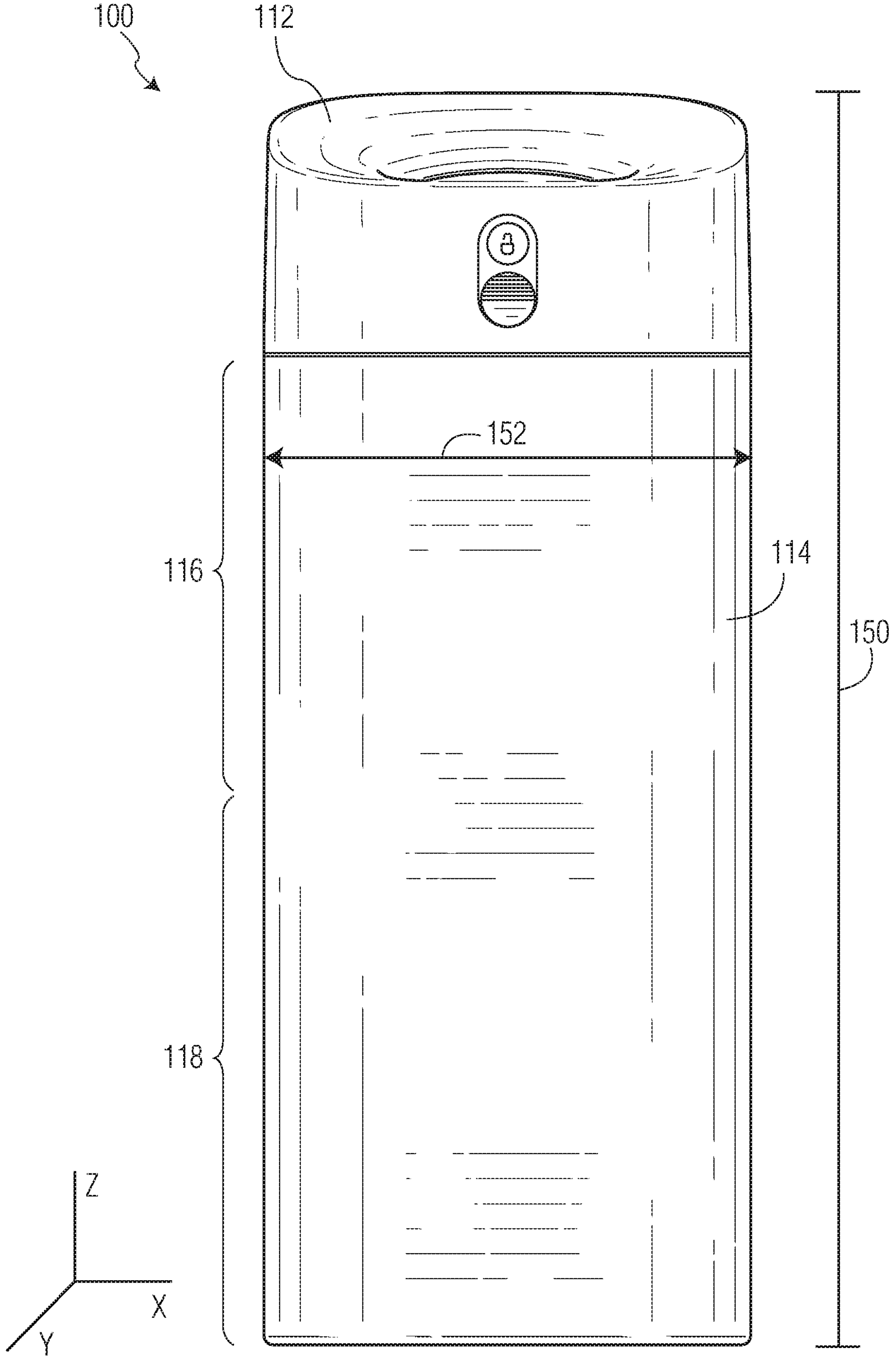
FIG. 1B is a front view of the waste receptacle shown in FIG. 1.
Figure 1C:
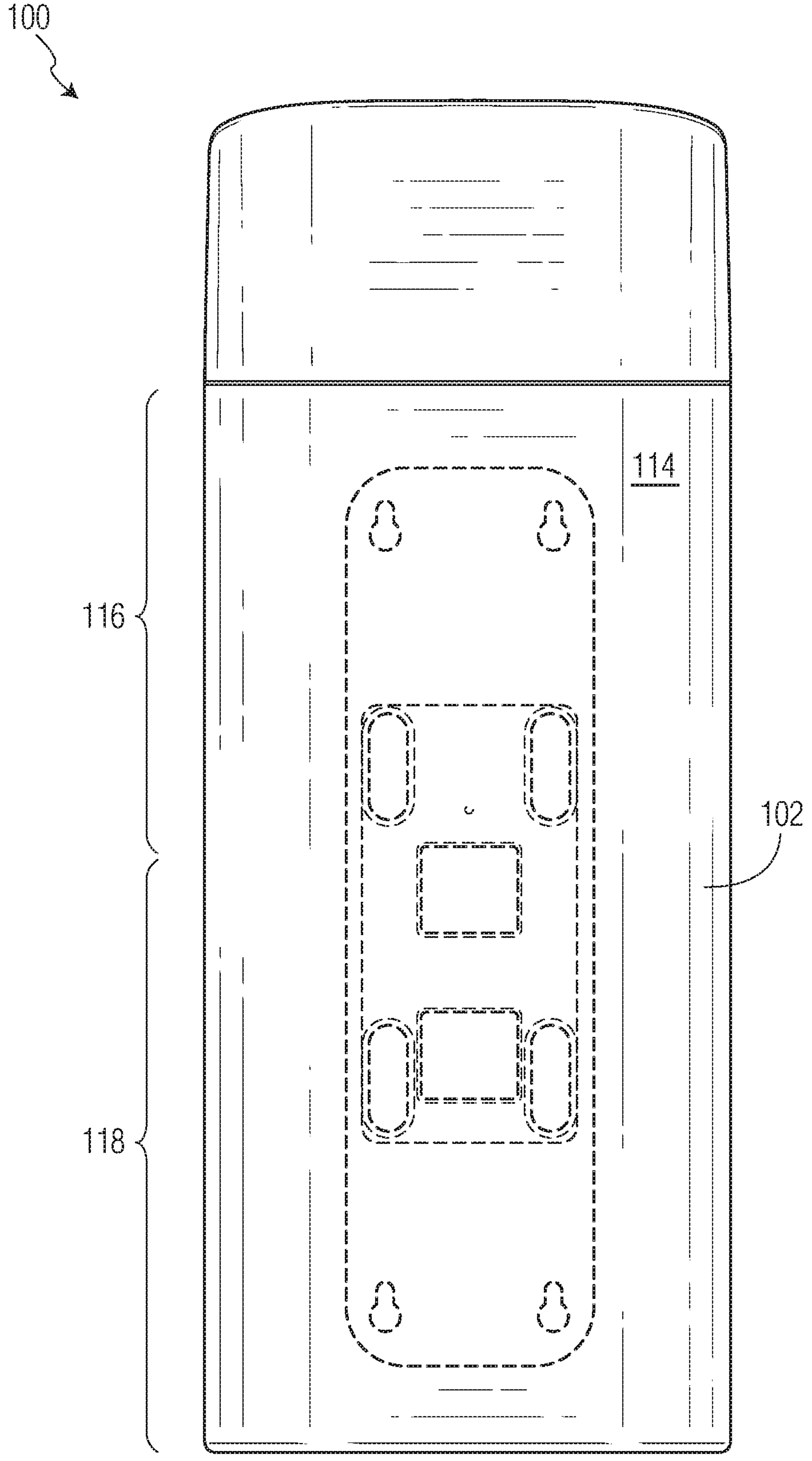
FIG. 1C is a back view of the waste receptacle shown in FIG. 1.
Figure 1D:
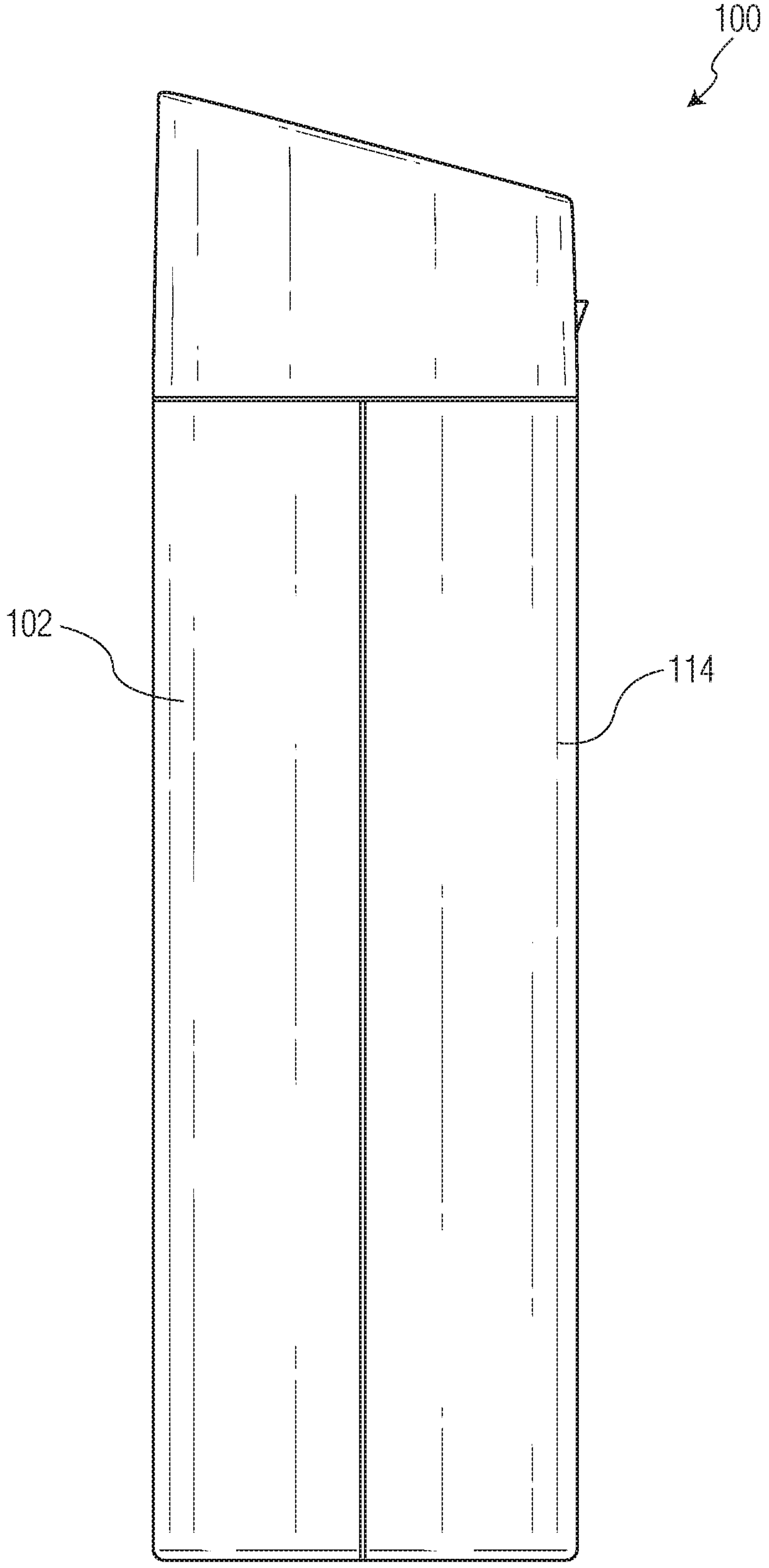
FIG. 1D is a top view of the waste receptacle shown in FIG. 1.
Figure 1E:
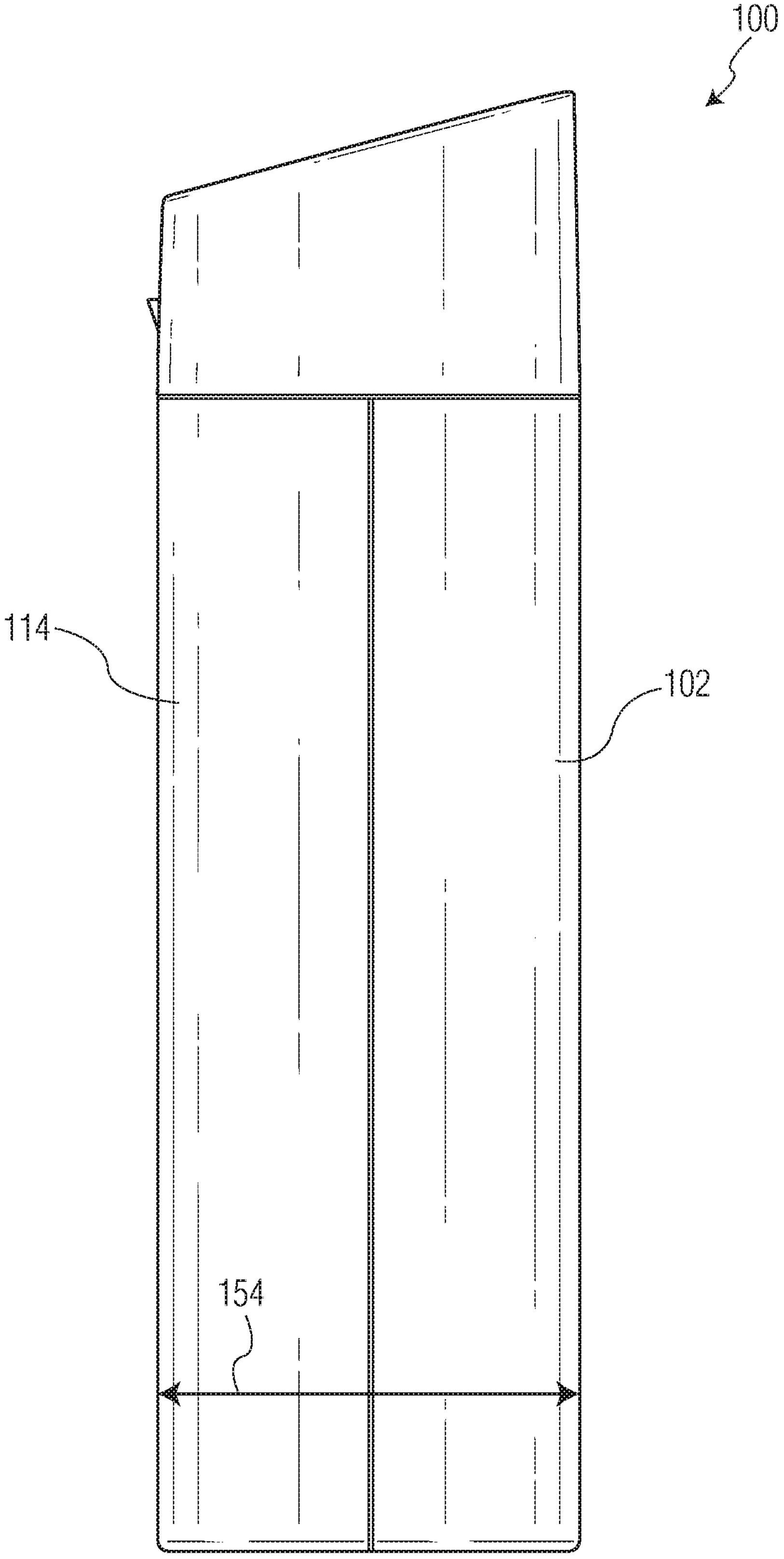
FIG. 1E is a bottom view of the waste receptacle shown in FIG. 1.
Figure 1F:
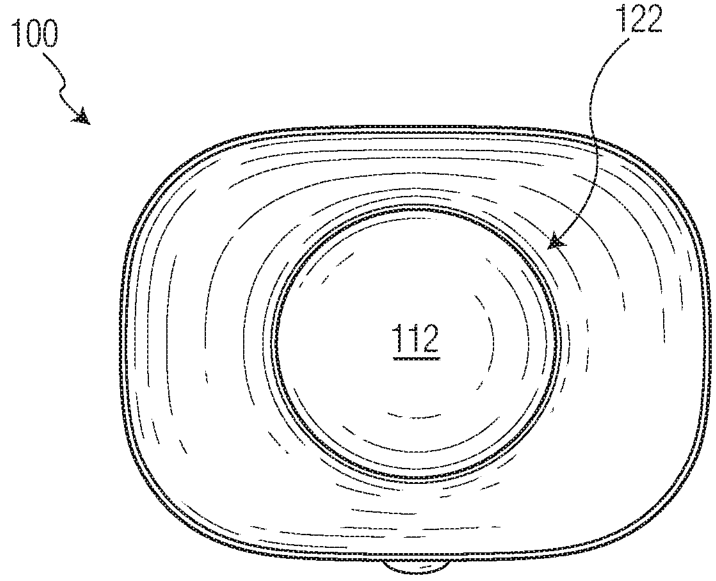
FIG. 1F is a right-side view of the waste receptacle shown in FIG. 1.
Figure 1G:
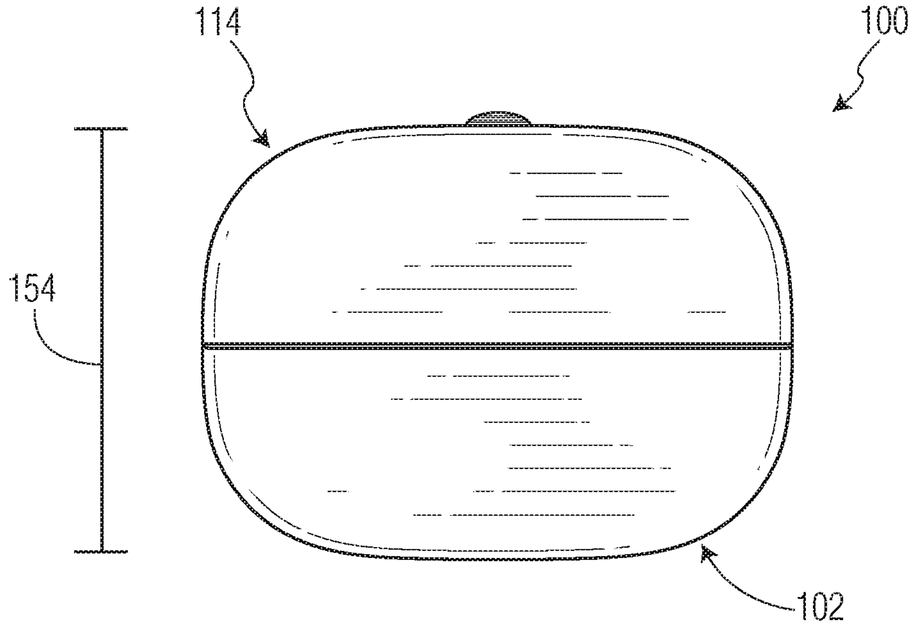
FIG. 1G is a left-side view of the waste receptacle shown in FIG. 1.

Repeat use of reference characters in the present specification and drawings is intended to represent the same or analogous features or elements of the disclosure.

DETAILED DESCRIPTION OF THE DISCLOSURE

Given the space constraints in many bathroom/washroom stalls managing the location and placement of the various stall fixtures (e.g., toilet, bath tissue dispenser, hand rail, waste receptacle and/or the like) is challenging. This challenge is further heightened when taking into consideration ease of occupant use and service personnel maintenance of such fixtures. To address these challenges, the waste receptacle described herein has an elongated shape, with a specifically selected height and depth ratio, to increase the amount of waste the receptacle can hold while reducing the extent the receptacle intrudes into the occupant's stall space. Further, given these same space constraints, the receptacle includes a front door, to access the removable waste bin that holds the waste, that limits the how far the door can open to allow a service attendant to be in the stall, open the front door, and have adequate room to remove and empty the bin. The waste receptacle is described in more detail below with reference to the figures.

As shown in FIGS. 1A-H, in some implementations, the waste receptacle 100 is a receptacle for accepting and storing waste. Such waste includes, for example, feminine sanitary products, other hygiene products and/or general washroom waste such as used paper towels. In some implementations, the waste receptacle 100 is located in a washroom stall, for example, on a side wall of the stall, a back wall of the stall, a door of the stall or in a corner of the stall. A stall, for example, is a private or semi-private space housing a toilet or urinal. Private stalls generally have doors fully closing the stall off from the surrounding areas. However, the receptacle 100 can be located in other spaced-constrained areas of the washroom.

The receptacle 100 includes a columnar (elongated) body 102, e.g., a composite or metal housing providing shape and structure for the receptacle 100. The body 102 has (or defines at least partially) a waste bin holding area 110 that accepts or holds a waste bin 104. The waste bin 104 is the container that holds and stores waste once waste has been inserted into the receptacle 100. In some implementations the waste bin 104 occupies a majority or substantially all (e.g., over 75% or 85%) of the volume of the body 102 (or holding area 100) and is similar in shape to the body 102 and/or holding area 110 such that the bin 104 also has, for example, an elongated columnar shape. In some implementations the bin 104 is removable from the body 102 to facilitate emptying waste from the receptacle 100. The waste bin 104 can be, for example, sized and shaped to readily accept standard trash bag sizes.

Generally, the body 102 has an upper body portion 106 and a lower body portion 108 opposite the upper body portion 106. When mounted or otherwise located in a stall for use the upper body portion 106 is vertically higher than the lower body portion 108. In some implementations the holding area 110 and the bin 104 span across both the upper body portion 106 and a lower body portion 108. The upper portion 106 includes a waste opening 112 through which waste can, for example, vertically enter the holding area 110 (e.g., the interior of the receptacle) and deposit in the bin 104, as opposed to entering the bin 104 through a side of the body 102 or the front door 114. In some implementations, the disc- or plate-shaped waste opening 112 is located more in a horizontal plane (e.g., xy plane) than a vertical plane (e.g., xz or yz planes). This enables a gravity feed entry for waste into the waste bin 104 and allows a stall occupant to use vertical space (above the receptacle 100) to add waste to the receptacle 100 given that horizontal space in a stall is generally more constrained than vertical space.

In some implementations, the body 102 has a back portion 119 distal the front door 114, and the receptacle 100 includes a wall mount device 117 releasably attachable to the back portion 119.

The receptacle 100, as mentioned above, has a front door or hatch 114 through which the bin 104 can be inserted and removed from the holding area 110. In some implementations the body 102 and front door 114 define the holding area 110 (e.g., when the front door 114 is closed/in the closed position as described in more detail below).

Figure 1H:
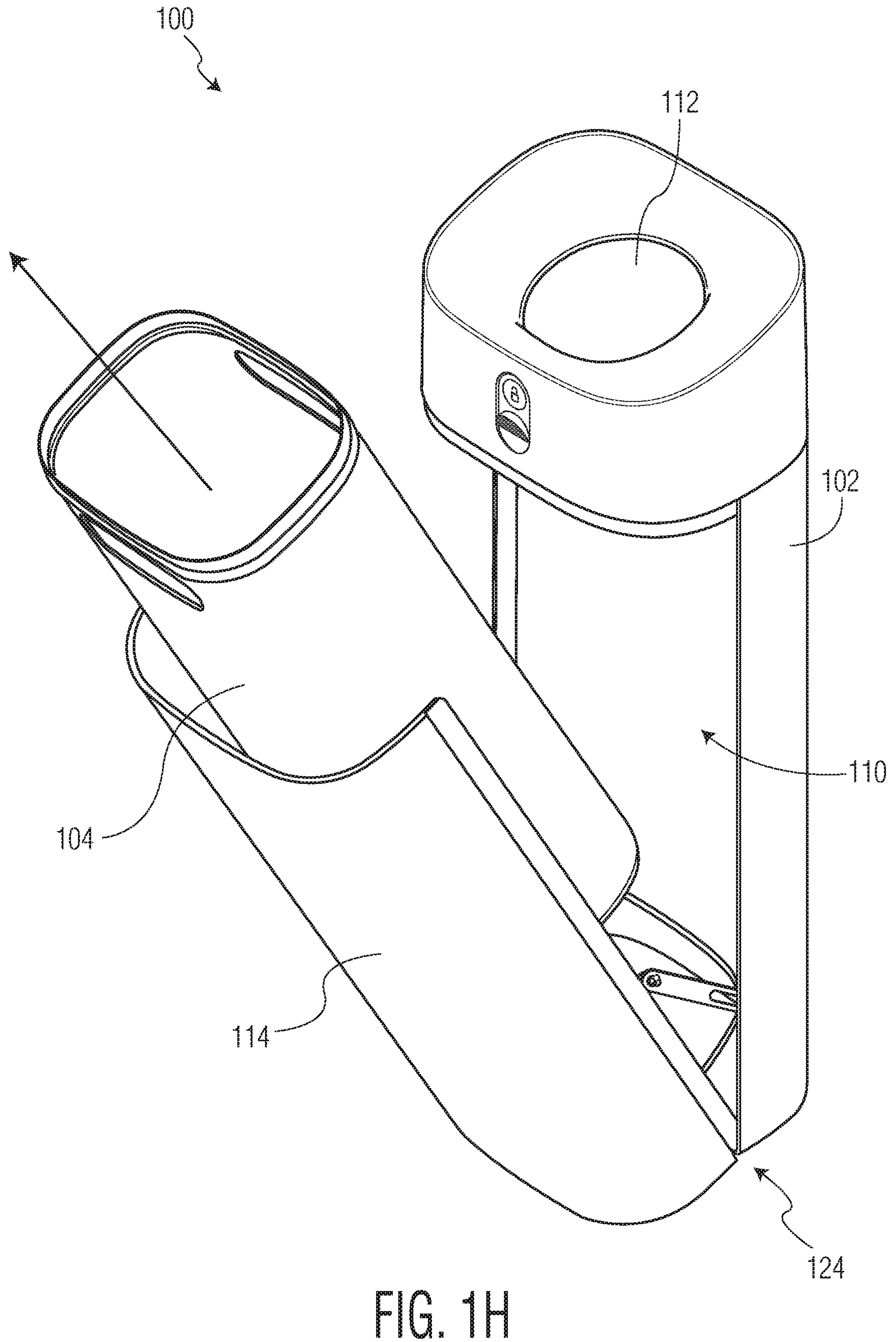
FIG. 1H is front perspective view of the waste receptacle shown in FIG. 1 in an open position.
Figure 2:
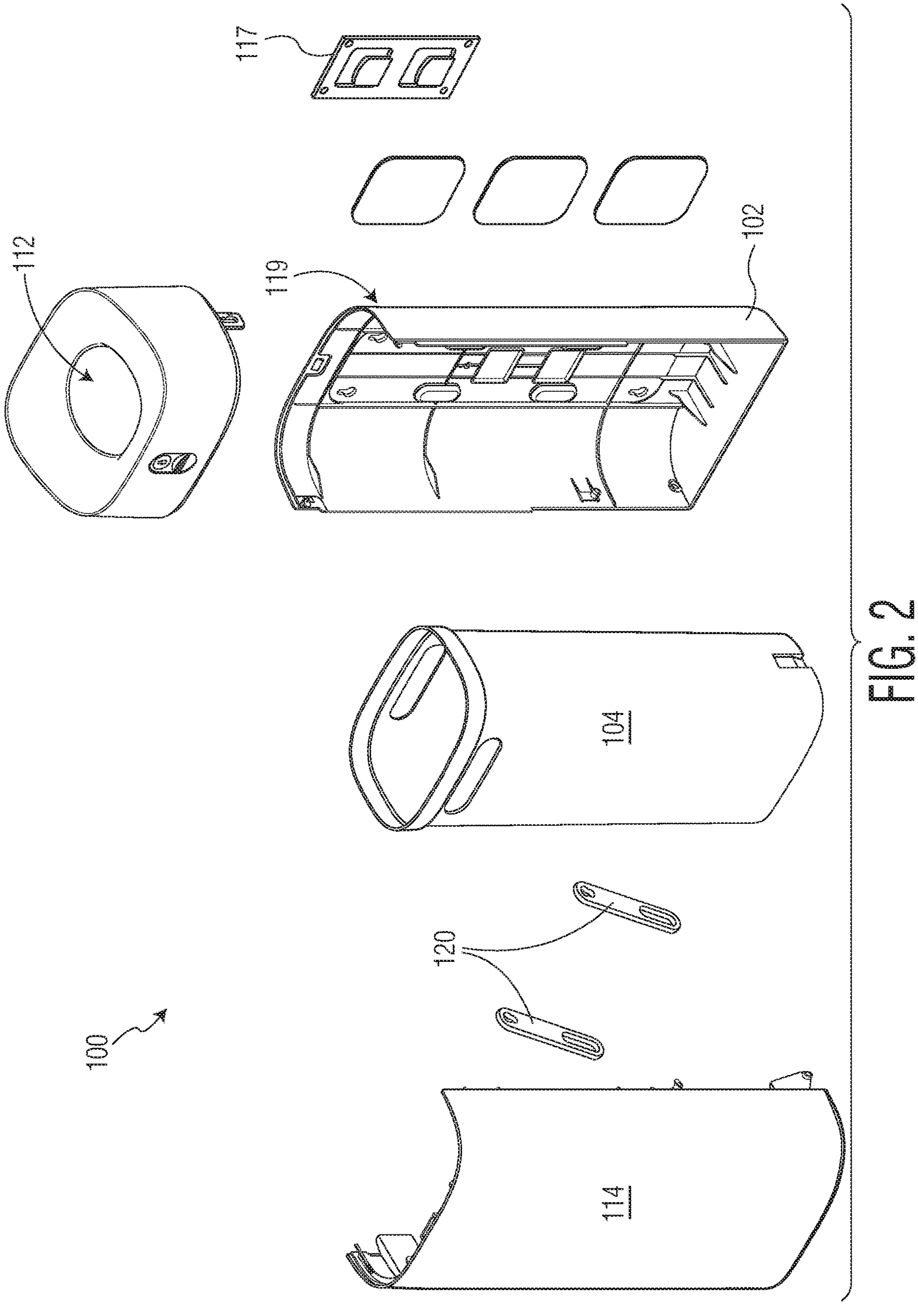
FIG. 2 is an exploded view of waste receptacle shown in FIG. 1.

The front door 114 has a top portion 116 and bottom portion 118. In some implementations the bottom portion 116 is pivotally attached to the lower body portion 108 by, for example, a hinge 124. In this way the top portion 116 of the front door 114 can open by swinging away from the upper body portion 106 of the body 102, which allows the bin 104 to be inserted and removed. This "open position" is shown, for example, in FIG. 1H, and the receptacle 100 in its "closed position" is shown, for example, in FIG. 1A. FIG. 2 is an exploded view of waste receptacle 100 further detailing certain aspects of the receptacle 100. In some implementations the bin 104 is not removable from the receptacle 100 but rather a trash bag placed in the bin 104 can be removed to empty waste from the receptacle 100 and be replaced with a new or emptied trash bag.

Figure 3A:
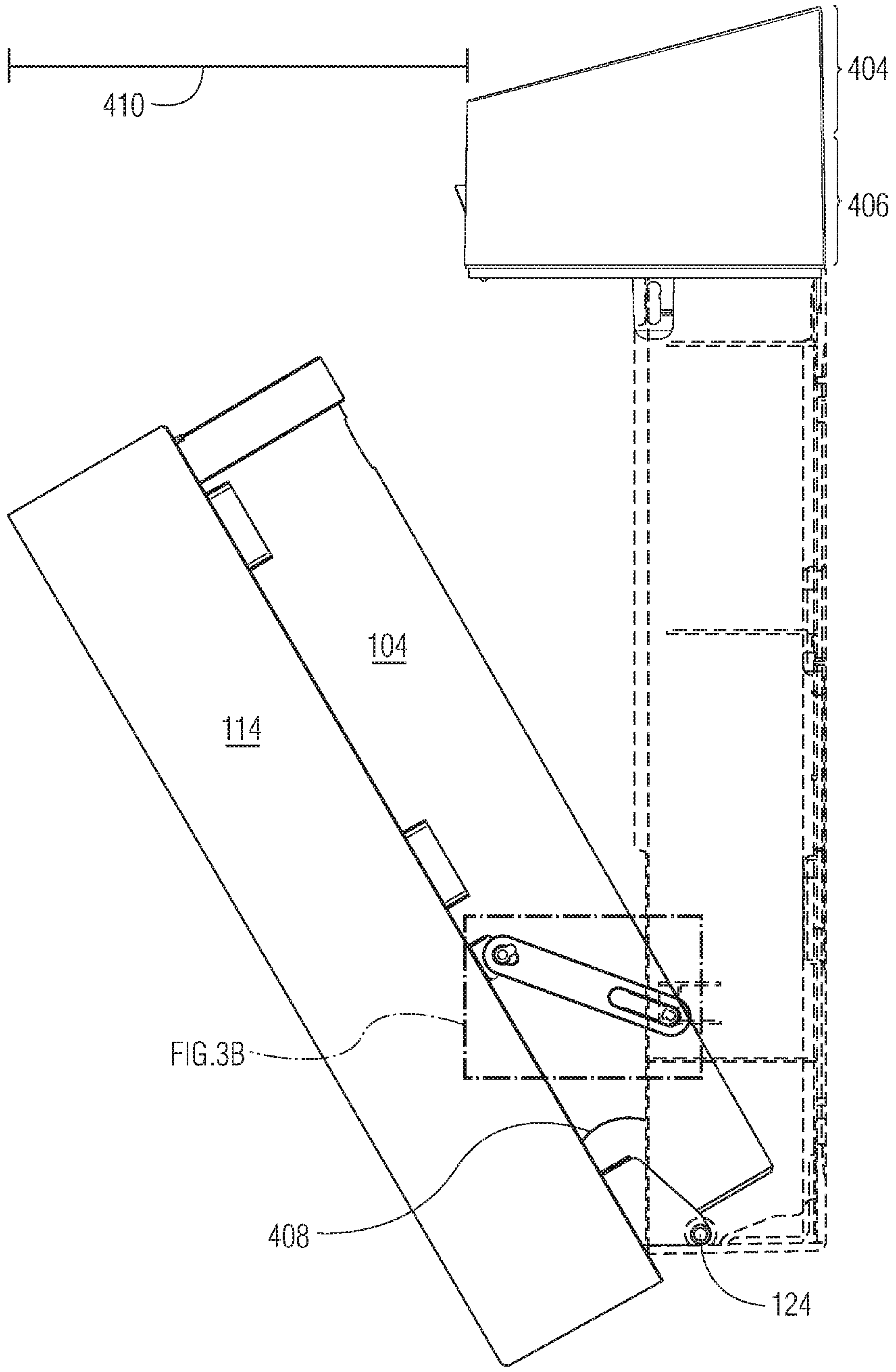
FIG. 3A is a side view of the waste receptacle shown in FIG. 2
Figure 3B:
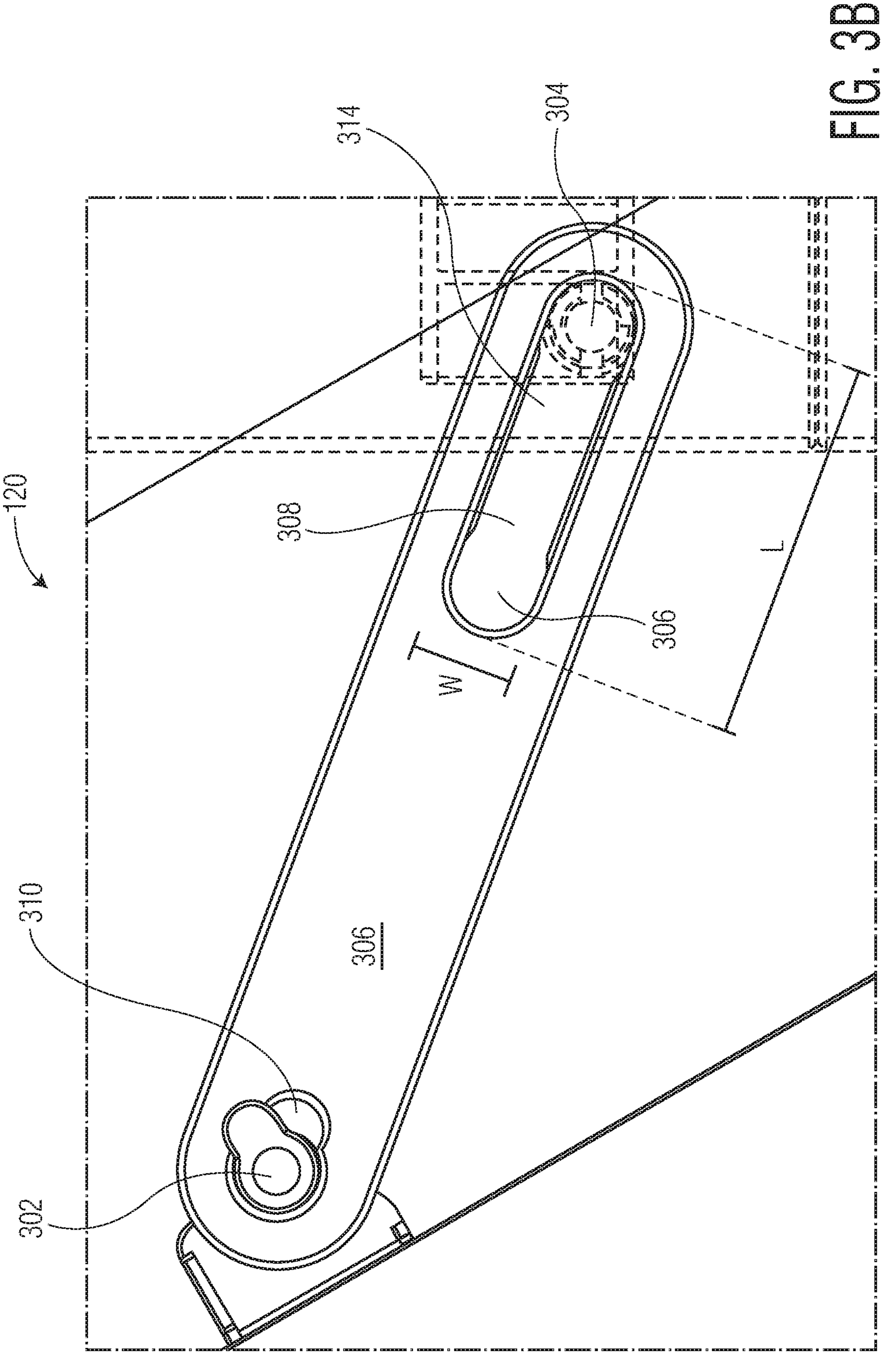
FIG. 3B is detail view of the opening restraint device of the waste receptacle shown in FIG. 3A.

The receptacle 100 includes an opening restraint device 120 to prevent the front door 114 from pivoting too far away from the body 102 (e.g., the upper body portion 106). For example, opening restraint device 120 prevents the front door from pivoting more than about 45 degrees (e.g., angle 408) and preferably from pivoting away from the body no more than about 30 degrees (e.g., angle 408). FIG. 3A is a side view of the waste receptacle 100, and FIG. 3B is a detail view of the opening restraint device 120. This angle 408 allowed by the opening restraint device 120 is shown, for example, in FIG. 3A. As described above, the angle 408 was selected to allow the front door 114 to sufficiently open to easily service the receptacle 100 by emptying the bin 104 yet not allowing the front door 114 to swing too far open to unwantedly intrude upon the stall occupant's space. To limit the opening of the front door 114, the opening restraint device 120 is connected to the body 102 and the front door 114, for example, as shown in FIG. 3B. In some implementations, the opening restraint device 114 limits the front door's 114 movement to no more than about 20 centimeters and preferably no more than about 17 centimeters, as shown as distance 410 in FIG. 3A.

In some implementations, the front door 114 has a door attachment structure 302, the body 102 has a body attachment structure 304, and the opening restraint device 120 includes an elongated plate 306. The door attachment structure 302 can be, for example, a protrusion or projection extending out from the surface of the front door 114. The body attachment structure 304 can also be, for example, a protrusion or projection extending out from the surface of the body 102.

The elongated plate 306 can be for example, a flat metal or plastic arm having an overall length (and a slot length L, as described below) and placed to allow the front door 114 to open to the specified angle 408 but no further. The plate 306 includes a slot 308 (e.g., a long and narrow opening in the plate 306) to receive the body attachment structure 304. The slot 308 has a length L (in FIG. 3B) that is greater than the width or diameter of the body attachment structure 304 to allow the body attachment structure 304 to slide along the length L of the slot 308 as the front door 114 is opened and closed. In some implementations the length of the slot L is between about 6.25 and 23 mm.

The slot 308 has a first end 312 and a second end 314, and a width (W in FIG. 3B). When the front door 114 is in the closed position the body attachment structure 304 is proximate the first end 312. As the front door 114 is opened the body attachment structure 304 moves along the slot 308 towards the second end 314. The front door 114 is fully opened when the body attachment structure 304 is at the second end 314.

In some implementations to prevent the front door 114 from opening too quickly the width W of the slot 308 is decreased from the first end 312 to the second end 314, i.e., the width W is larger proximate the first 312 than proximate the second end 314. This creates an increasing friction or drag on the body attachment structure 304 as it moves from the first end 312 in the closed position to the second end 314 in the open position. This provides a "soft opening" feature. In some implementations this soft opening can be provided by a strut or other dampening device.

The plate 306 also includes a door connector 310 to connect to the door attachment structure 302. The door connector 310 can be an opening in the plate 306 sized to accept the door attachment structure 302. For example, the door connector 310 has a diameter or width incrementally greater than that of the door attachment structure 302.

In some implementations, the slot 308 engages the door attachment structure 302, and not the body attachment structure 304, but otherwise works in a similar way to allow the front door 114 to open and close and, for example, dampen the opening of the front door 114 similar to that described above.

The receptacle 100 has a height 150, width 152 and depth 154. In some implementations receptacle 100 has an omega value defined as a ratio of the depth over the height and is between 0.25 and 0.33 and preferably between 0.27 and 0.32. Thus the omega value is equal to depth 154 divided by height 150 and is in the range of 0.25 to 0.33 and preferably between 0.27 and 0.32. This value is specified to balance the waste capacity of the receptacle 100 with the receptacle's form factor such that the receptacle 100 does not unnecessarily intrude into the stall occupant's space. The receptacle 100 can have, for example, a width of about 160 to 190 millimeters and/or a height of between about 325 to 350 millimeters. In some implementations, the front door 114 has a height 115 and the height 115 is at least seventy percent (70%) of the height 150 of the waste receptacle 100.

Figure 4A:
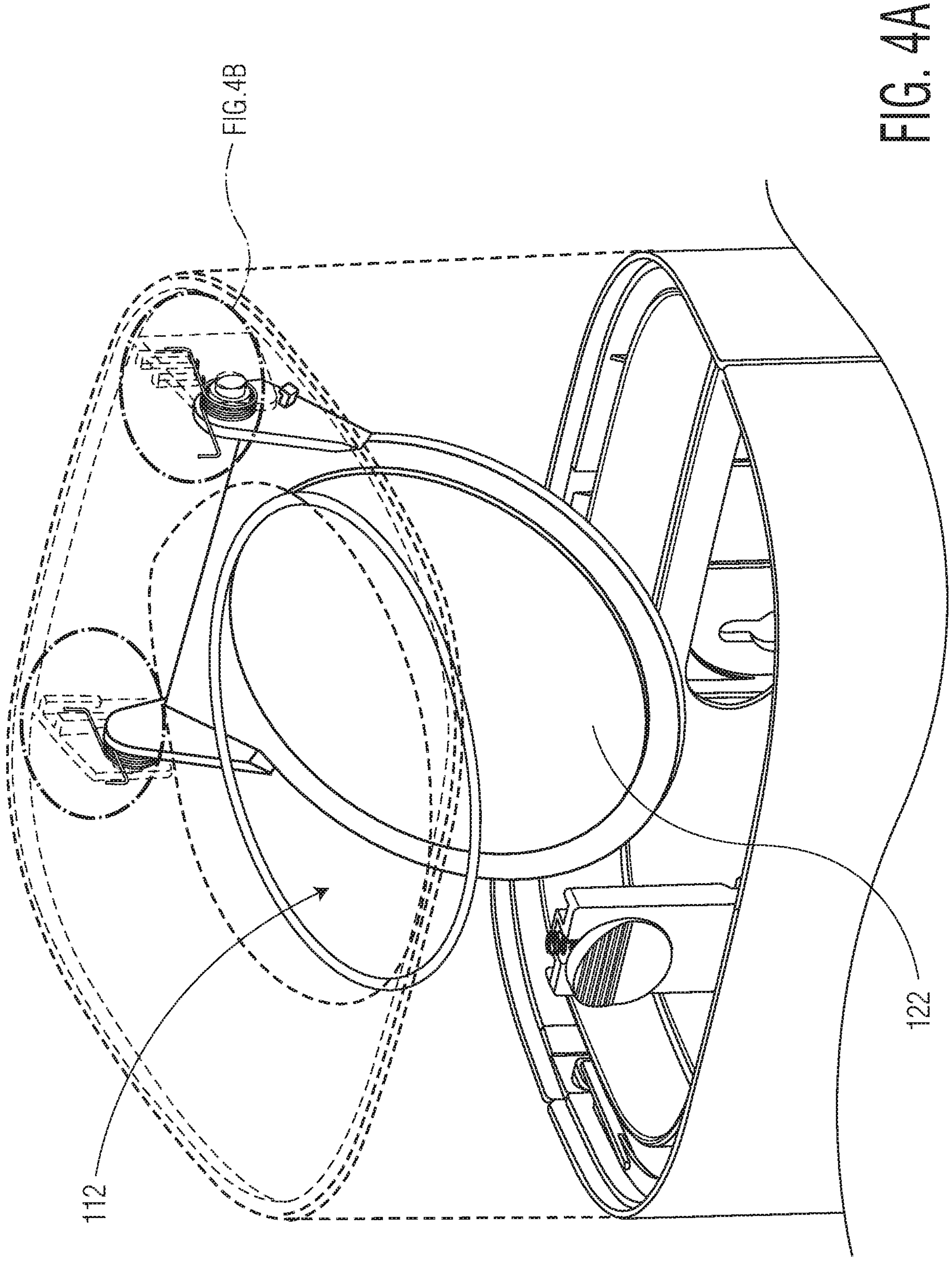
FIG. 4A is a partial cutaway view of the waste receptacle shown in FIG. 1
Figure 4B:
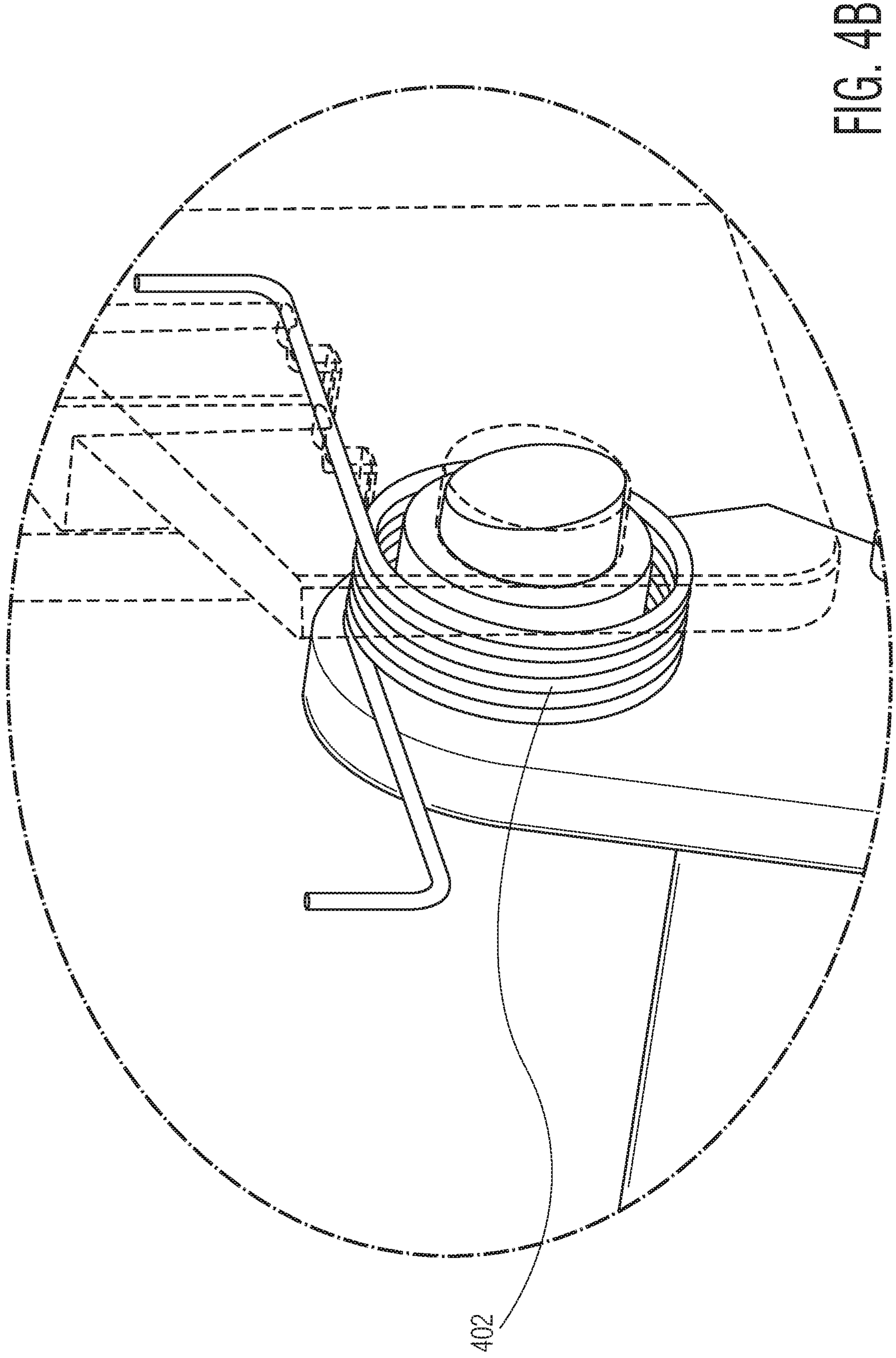
FIG. 4B is detail view of the waste opening of the waste receptacle shown in FIG. 4A.

The receptacle 100 includes a waste opening plate 122 pivotally attached proximate the waste opening 112, as shown in FIGS. 4*a* and 4B, which are, respectively, a partial cutaway view of the receptacle 100 and a detail view of the waste opening 112 of the receptacle 100. In some implementations the waste opening plate 122 is in a substantially horizontal plane (e.g., within twenty degrees of a horizontal plane) when in the closed position as shown in FIGS. 1A and 1H. The waste opening plate 122 can be, for example, a disc or other stricture that serves as a movable gate to the bin 104 to deposit waste in the receptacle 100. In the closed position the waste opening plate 122 prevents waste from entering the bin 104 and in the open position the waste opening plate 122 allows waste to enter the bin 104. When in the fully open position the waste opening plate 122 can be in the vertical plane or in a substantially vertical plane (e.g., within twenty degrees of a vertical plane).

The waste opening 112, in some implementations, has a top 404 and bottom 406 and the waste opening plate 122 is pivotally attached to the bottom 406 of the waste opening 112 (e.g., as shown inn FIG. 4A. In some implementations the receptacle 100 includes a resilient member 402, such as a spring 402, connected to the waste opening plate 122 to bias the waste opening plate 122 to the closed position described above.

EMBODIMENTS

Embodiment 1. A waste receptacle comprising a columnar body having a waste bin holding area configured to accept a waste bin, an upper body portion and a lower body portion, wherein the upper portion includes an waste opening through which waste can vertically enter the bin holding area; a front door having top and bottom portions, wherein the bottom portion is pivotally attached to the lower body portion; an opening restraint device connected to the body and the front door and configured to prevent the front door from pivoting away from the body more than about 45 degrees; and wherein the waste receptacle has a height, width and depth and has an omega value that is defined as a ratio of the depth over the height and is between 0.25 and 0.33.

Embodiment 2. The waste receptacle of embodiment 1, wherein the front door has a height and the height of the front door is at least seventy percent of the height of the waste receptacle.

Embodiment 3. The waste receptacle of any preceding embodiment, wherein the front door has an door attachment structure, the body has a body attachment structure, and the opening restraint device comprises an elongated plate with (i) a slot configured to receive the body attachment structure and (ii) a door connector to connect to the door attachment structure, wherein the slot has a first end and a second end with a width decreasing from the first end to the second end to create a friction fit as the body attachment structure slides along the slot during opening and closing the front door.

Embodiment 4. The waste receptacle of any preceding embodiment, wherein the value is between 0.27 and 0.32.

Embodiment 5. The waste receptacle of any preceding embodiment comprising a waste opening plate pivotally attached proximate the waste opening.

Embodiment 6. The waste receptacle of embodiment 5 comprising a resilient member connected to the waste opening plate and configured to bias the waste opening plate to close the waste opening.

Embodiment 7. The waste receptacle of embodiment 6 wherein the resilient member is a spring.

Embodiment 8. The waste receptacle of embodiment 5 wherein the waste opening has a top and bottom and the waste opening plate is pivotally attached to the bottom of the waste opening.

Embodiment 9. The waste receptacle of embodiment 8, wherein the waste opening plate, when in the closed position, is in a horizontal plane.

Embodiment 10. The waste receptacle of any preceding embodiment, wherein the opening restraint device is configured to prevent the front door from pivoting away from the body more than about 30 degrees.

Embodiment 11. The waste receptacle of any preceding embodiment, wherein the opening restraint device is configured to prevent the front door from pivoting away from the body no more than about 20 centimeters and preferably no more than about 17 centimeters.

Embodiment 12. A waste receptacle for sanitary pads comprising an elongated body having a waste bin holding area configured to accept a waste bin, an upper body portion and a lower body portion, wherein the upper portion includes an waste opening through which waste can vertically enter the bin holding area; a front door having top and bottom portions; a hinge connected to the bottom portion of the front door and the lower body portion; and wherein the waste receptacle has a height, width and depth and has an omega value that is defined as a ratio of the depth over the height and is between 0.25 and 0.33.

Embodiment 13. The waste receptacle of embodiment 12 comprising an opening restraint device connected to the body and the front door and configured to prevent the front door from pivoting away from the body more than about 30 degrees.

Embodiment 14. The waste receptacle of embodiment 13, wherein the front door has an door attachment structure, the body has a body attachment structure, and the opening restraint device comprises an elongated plate with (i) a slot configured to receive the body attachment structure and (ii) a door connector to connect to the door attachment structure, wherein the slot has a first end and a second end with a width decreasing from the first end to the second end to create a friction fit as the body attachment structure slides along the slot during opening and closing the front door.

Embodiment 15. The waste receptacle of embodiment 13, wherein the front door has an door attachment structure, the body has a body attachment structure, and the opening restraint device comprises an elongated plate with (i) a slot configured to receive the door attachment structure and (ii) a body connector to connect to the body attachment structure, wherein the slot has a first end and a second end with a width decreasing from the first end to the second end to create a friction fit as the door attachment structure slides along the slot during opening and closing the front door.

Embodiment 16. The waste receptacle of any of embodiments 12-15, wherein the waste opening has a width of about 80 to 90 millimeters.

Embodiment 17. The waste receptacle of any of embodiments 12-16, wherein the waste receptacle has a width of about 160 to 190 millimeters.

Embodiment 18. The waste receptacle of any of embodiments 12-17, wherein the value is between 0.27 and 0.32.

Embodiment 19. The waste receptacle of any of embodiments 12-18, wherein the elongated body has a back portion distal the front door and the waste receptacle comprises a wall mount device releasable attachable to the back portion.

Embodiment 20. The waste receptacle of any of embodiments 12-19, wherein the waste bin has a height of between about 325 to 350 millimeters.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A waste receptacle comprising:

a columnar body having a waste bin holding area including a removable waste bin, an upper body portion and a lower body portion, wherein the upper portion includes a waste opening through which waste can vertically enter the bin holding area;

a front door having top and bottom portions, wherein the bottom portion is pivotally attached to the lower body portion;

an opening restraint device connected to the body and the front door and configured to prevent the front door from pivoting away from the body more than 17 centimeters;

wherein the receptacle has a height, width and depth and has an omega value that is defined as a ratio of the depth over the height and is between 0.27 and 0.32, and wherein the receptacle width is between 160 and 190 millimeters and the receptacle height is between 325 and 350 millimeters, and a height of the front door is at least seventy percent (70%) of the height of the body.

2. The waste receptacle of claim 1, wherein the front door has door attachment structure, the body has a body attachment structure, and the opening restraint device comprises an elongated plate with (i) a slot configured to receive the body attachment structure and (ii) a door connector to connect to the door attachment structure, wherein the slot has a first end and a second end with a width decreasing from the first end to the second end to create a friction fit as the body attachment structure slides along the slot during opening and closing the front door.

3. The waste receptacle of claim 1 comprising a waste opening plate pivotally attached proximate the waste opening.

4. The waste receptacle of claim 3 comprising a resilient member connected to the waste opening plate and configured to bias the waste opening plate to close the waste opening.

5. The waste receptacle of claim 4 wherein the resilient member is a spring.

6. The waste receptacle of claim 5 wherein the waste opening plate is pivotally attached to a bottom of the upper portion.

7. The waste receptacle of claim 6, wherein the waste opening plate, when in the closed position, is in a horizontal plane.

8. A waste receptacle for sanitary pads comprising:

an elongated body having a waste bin holding area including a removable waste bin, an upper body portion and a lower body portion, wherein the upper portion includes a waste opening through which waste can vertically enter the bin holding area;

a front door having top and bottom portions;

a hinge connected to the bottom portion of the front door and the lower body portion;

an opening restraint device connected to the body and the front door and configured to prevent the front door from pivoting away from the body more than 17 centimeters;

wherein the receptacle has a height, width and depth and has an omega value that is defined as a ratio of the depth over the height and is between 0.27 and 0.32, and wherein the receptacle width is between 160 and 190 millimeters and the receptacle height is between 325 and 350 millimeters, and a height of the front door is at least seventy percent (70%) of the height of the body.

9. The waste receptacle of claim 8, wherein the front door has an door attachment structure, the body has a body attachment structure, and the opening restraint device comprises an elongated plate with (i) a slot configured to receive the body attachment structure and (ii) a door connector to connect to the door attachment structure, wherein the slot has a first end and a second end with a width decreasing from the first end to the second end to create a friction fit as the body attachment structure slides along the slot during opening and closing the front door.

10. The waste receptacle of claim 8, wherein the front door has an door attachment structure, the body has a body attachment structure, and the opening restraint device comprises an elongated plate with (i) a slot configured to receive the door attachment structure and (ii) a body connector to connect to the body attachment structure, wherein the slot has a first end and a second end with a width decreasing from the first end to the second end to create a friction fit as the door attachment structure slides along the slot during opening and closing the front door.

11. The waste receptacle of claim 8, wherein the waste opening has a width of about 80 to 90 millimeters.

12. The waste receptacle of claim 8, wherein the elongated body has a back portion distal the front door and the waste receptacle comprises a wall mount device releasably attachable to the back portion.

* * * * *